(12) United States Patent
Young et al.

(10) Patent No.: US 11,756,013 B2
(45) Date of Patent: *Sep. 12, 2023

(54) SYSTEMS AND METHODS FOR VIRTUAL CURRENCY EXCHANGE

(71) Applicant: MASTERCARD INTERNATIONAL INCORPORATED, Purchase, NY (US)

(72) Inventors: John Young, O'Fallon, MO (US); Bradley Kenneth Dickinson, O'Fallon, MO (US); Bryan Niehaus, Clayton, MO (US); John E. Roth, Waterloo, IL (US); Sai Sudha Venkata Chaganti, Ballwin, MO (US); Anupama Zagabathuni, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/516,416

(22) Filed: Nov. 1, 2021

(65) Prior Publication Data

US 2022/0058600 A1     Feb. 24, 2022

Related U.S. Application Data

(63) Continuation of application No. 15/813,616, filed on Nov. 15, 2017, now Pat. No. 11,164,167.

(51) Int. Cl.
*G06Q 20/10*     (2012.01)
*G06Q 20/14*     (2012.01)
(Continued)

(52) U.S. Cl.
CPC ......... *G06Q 20/108* (2013.01); *G06Q 20/145* (2013.01); *G06Q 20/204* (2013.01);
(Continued)

(58) Field of Classification Search
None
See application file for complete search history.

(56) References Cited

U.S. PATENT DOCUMENTS 5,069,453 A * 12/1991 Koza ..................... A63F 3/081
                                                        463/40
5,724,520 A     3/1998   Goheen
(Continued)

*Primary Examiner* — Fateh M Obaid
(74) *Attorney, Agent, or Firm* — Armstrong Teasdale LLP

(57) ABSTRACT

A method for initiating a virtual currency exchange includes a merchant computing device a) receiving a message including a user account identifier, payment credential data, and a request for an amount of virtual currency to be delivered; b) transmitting a message delivering the requested amount of virtual currency; and c) receiving a user assignment message that assigns to the merchant an amount of assigned virtual currency from the delivered virtual currency. Steps a, b, and c are performed while the merchant computing device is in a first physical location. The method also includes, subsequent to steps a, b, and c, connecting to a payment network while the merchant computing device is at a second physical location and transmitting, to a virtual currency payment system via the payment network, an assignment completion message including the user account identifier, a merchant account identifier associated with the merchant, and the assigned virtual currency.

20 Claims, 6 Drawing Sheets

(51) Int. Cl.
*G06Q 20/40* (2012.01)
*G06Q 20/20* (2012.01)
*G06Q 20/32* (2012.01)

(52) U.S. Cl.
CPC ..... *G06Q 20/3224* (2013.01); *G06Q 20/3278* (2013.01); *G06Q 20/40* (2013.01)

(56) References Cited

U.S. PATENT DOCUMENTS

| | | |
|---|---|---|
| 7,873,540 B2 | 1/2011 | Arumugam |
| 8,554,634 B2 | 10/2013 | Lewin |
| 9,183,551 B2 | 11/2015 | Nuzzi et al. |
| 10,535,065 B2 | 1/2020 | Muftic |
| 2004/0006497 A1 | 1/2004 | Nestor et al. |
| 2009/0055269 A1 | 2/2009 | Baron |
| 2010/0070312 A1 | 3/2010 | Hunt |
| 2014/0039945 A1 | 2/2014 | Coady et al. |
| 2014/0095219 A1 | 4/2014 | Zises |
| 2014/0115498 A1 | 4/2014 | Jackson et al. |
| 2016/0019536 A1* | 1/2016 | Ortiz ............ G06Q 20/36 705/67 |
| 2016/0110695 A1 | 4/2016 | Zhou et al. |
| 2016/0189137 A1 | 6/2016 | Zhou et al. |
| 2016/0241532 A1 | 8/2016 | Loughlin-Mchugh et al. |
| 2016/0267462 A1 | 9/2016 | Batlle |
| 2016/0275483 A1 | 9/2016 | Zhou |
| 2017/0262833 A1 | 9/2017 | Xing |
| 2018/0158036 A1 | 6/2018 | Zhou et al. |
| 2018/0293834 A1 | 10/2018 | Cage et al. |
| 2019/0066063 A1* | 2/2019 | Jessamine ............ G06F 21/629 |
| 2019/0102756 A1 | 4/2019 | Zhou et al. |
| 2019/0147440 A1 | 5/2019 | Deliwala et al. |
| 2019/0325407 A1 | 10/2019 | Zhou et al. |

* cited by examiner

SYSTEMS AND METHODS FOR VIRTUAL CURRENCY EXCHANGE

CROSS REFERENCE TO RELATED APPLICATIONS

This application is a continuation of, and claims priority to, U.S. application Ser. No. 15/813,616 filed Nov. 15, 2017, the entire contents of which are hereby incorporated by reference.

BACKGROUND OF THE DISCLOSURE

The field of the disclosure relates generally to exchanging virtual currency, and more specifically to methods and systems for exchanging virtual currency between a customer and a merchant at a mobile event, at least partially without the need for a network connection.

A customer who attends a carnival or small mobile event must typically purchase tokens or tickets by placing an order at a merchant ticket sales location operated by a sales representative. Additionally, the customer typically initiates payment using a traditional payment instrument, such as cash, because the merchant does not have access to a payment network. A connection to a cellular or other general network may also be nonexistent or unreliable because of the geographical location of the mobile event. The customer must estimate the number or value of tickets that they will use while visiting the merchant, which can result in wasted unused tickets for the consumer and a loss of sales for the merchant. For example, the number of tickets purchased by the customer may be more or less than what the customer actually ends up using, or wants to use. Having to return to the ticket purchasing location to exchange cash for more tickets can be time consuming and can distract from the experience, and tickets not used while at the mobile event represent a lost investment for the customer. Additionally, tickets purchased at mobile events are typically only for the event or services offered at the event itself, are not exchangeable for other items such as food or gifts, and are non-refundable after purchase. Thus, there exists a need for a fast and convenient system for exchanging virtual currency between a customer and a merchant at a mobile event in exchange for goods or services without dependence on a network connection.

BRIEF DESCRIPTION OF THE DISCLOSURE

In one aspect, a mobile event payment (MEP) computing system used for exchanging virtual currency between a user and a merchant at a mobile event is provided. The MEP computing system includes a MEP computing device including a processor communicatively coupled to a memory device, the MEP computing device in communication with at least a user mobile device having local data stores. The processor is programmed to store, within the memory device, a user profile and a merchant profile for exchanging virtual currency, each user and merchant profile including a current amount of virtual currency and an account identifier, the user profile further including payment credential data associated with the user and a user mobile device identifier. The processor is also programmed to receive a virtual currency delivery message that includes an account identifier, a request for virtual currency to be delivered, and an input mobile device identifier. The processor is further programmed to transmit a virtual currency delivery message to the mobile device associated with the input mobile device identifier when the input mobile device identifier matches the user mobile device identifier stored in the user profile, wherein the virtual currency delivery message includes the requested amount and types of virtual currency. The processor is also programmed to store the requested amount of virtual currency with the current amount of virtual currency as the updated amount of virtual currency. The processor is programmed to receive a virtual currency payment message including an account identifier associated with the merchant, the virtual currency assignment message including a paid amount of virtual currency, wherein the paid amount of virtual currency is an amount of virtual currency assigned by the user for payment to the merchant. The processor is also programmed to electronically deduct the amount of paid virtual currency from the updated amount of virtual currency of the user account. The processor is further programmed to electronically add the paid virtual currency to the virtual currency of the account associated with the merchant profile.

In another aspect, a computer-implemented method for exchanging virtual currency between a user and a merchant at a mobile event is provided. The method is implemented using a mobile event payment (MEP) computing system including a processor in communication with a memory device. The method includes storing, within the memory device, a user profile and a merchant profile for exchanging virtual currency, each user and merchant profile including a current amount of virtual currency and an account identifier, the user profile further including payment credential data associated with the user and a user mobile device identifier. The method also includes receiving a virtual currency delivery message that includes an account identifier, a request for virtual currency to be delivered, and an input mobile device identifier. The method further includes transmitting a virtual currency delivery message to the mobile device associated with the input mobile device identifier when the input mobile device identifier matches the user mobile device identifier stored in the user profile, wherein the virtual currency delivery message includes the requested amount and types of virtual currency. The method includes storing the requested amount of virtual currency with the current amount of virtual currency as the updated amount of virtual currency. The method also includes receiving a virtual currency payment message including an account identifier associated with the merchant, the virtual currency assignment message including a paid amount of virtual currency, wherein the paid amount of virtual currency is an amount of virtual currency assigned by the user for payment to the merchant. The method further includes electronically deducting the amount of paid virtual currency from the updated amount of virtual currency of the user account. The method includes electronically adding the paid virtual currency to the virtual currency of the account associated with the merchant profile.

In still another aspect, a computer implemented method for initiating a virtual currency transaction for purchasing goods and services at a mobile event is provided. The method includes receiving, at a merchant computing device, a virtual currency request message including transaction data from a user, payment credential data associated with the user, and a request for an amount of virtual currency to be delivered. The method also includes transmitting, to a user computing device, a virtual currency delivery message, wherein the virtual currency delivery message includes the requested amount and types of virtual currency. The method further includes receiving, at the merchant computing device, a virtual currency payment message including a paid amount of virtual currency including a paid amount of virtual currency, wherein the paid amount of virtual currency includes an amount of virtual currency assigned by the user for payment to the merchant. The method includes storing, within a database coupled to the merchant computing device, the transaction data including the user account number

BRIEF DESCRIPTION OF THE DRAWINGS

FIG. 1 is a schematic diagram illustrating an example multi-party payment card processing system for enabling payment-by-card transactions between merchants, cardholders, and card issuers.

FIG. 2 is a simplified block diagram of an example system used for enabling virtual currency exchange as part of a payment transaction.

FIG. 3 illustrates an example configuration of a user computing device shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart of a process exchanging virtual currency as part of a payment transaction at a mobile event using the system shown in FIG. 2.

FIG. 6 is a diagram of components of one or more example computing devices that may be used in the system shown in FIG. 2.

DETAILED DESCRIPTION OF THE DISCLOSURE

Figure 1:
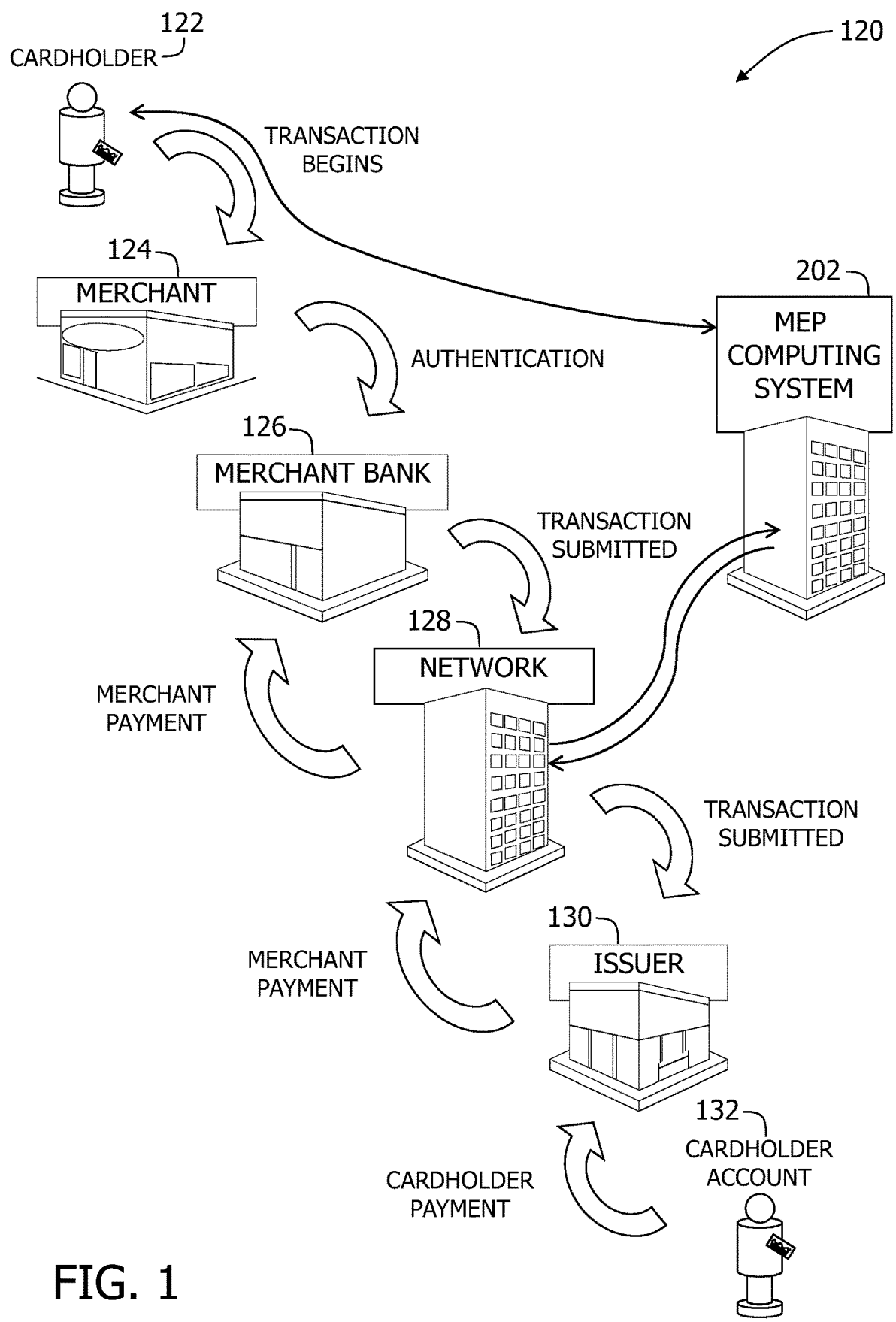
FIGS. 1-6 show example embodiments of the methods and systems described herein.

The embodiments described herein are directed to systems and methods for exchanging virtual currency between a user and a merchant at a mobile event. In one embodiment, a mobile event payment (MEP) system includes a MEP computing device including a processor communicatively coupled to a memory device that stores a user profile and a merchant profile. The MEP computing device processes virtual currency exchanges between the user and the merchant as part of a payment transaction. In another embodiment, a user purchases virtual currency from a merchant and transfers the virtual currency to the merchant in exchange for goods or services at the merchant's mobile event without the need for a network connection. The user has a user computing device that is in communication with a merchant's computing device and information is exchanged between the computing devices until the transaction is complete.

In an example embodiment, a user and a merchant are in communication with the MEP computing system, which stores user and merchant profile information including a virtual currency balance amount, an associated user account identifier, and a mobile device identifier. In the example embodiment, the MEP computing system receives a virtual currency delivery message associated with the user account identifier. The virtual currency delivery message includes a virtual currency request amount and an input mobile device identifier. The user is able to request virtual currency for a merchant's mobile event prior to attending the mobile event through the use of the virtual currency delivery message. The MEP computing system compares the input mobile device identifier with the mobile device identifier associated with the user account identifier in the user's profile, and transmits a virtual currency delivery message to the mobile device associated with the mobile device identifier in the user profile if the two device identifiers match. The virtual currency delivery message includes the withdrawn virtual currency request amount and a virtual currency identifier.

After receiving the virtual currency delivery message, or before purchasing any virtual currency, the user enters the merchant's mobile event location, such as a carnival, and initiates an electronic transaction with the merchant (e.g., via near field communication) using a user computing device associated with the user. In an example embodiment, the user computing device is mobile device. The user computing device is detected by the merchant computing device and establishes communication over a wireless connection, such as a near field communication (NFC) system. In the example embodiment, the user computing device and the merchant computing device communicate using a passive wireless connection. In another embodiment, the merchant computing device communicates with the user computing device using an active wireless connection.

In the example embodiment, after the user computing device and the merchant computing device have established a communication connection, if the user customer desires to purchase virtual currency, the merchant computing device receives a virtual currency request message from the user. The virtual currency request message includes transaction data from the user including an account number associated with the user, payment credential data associated with the user, and a virtual currency purchase amount.

Following a request from the user to purchase virtual currency via a virtual currency request message, a virtual currency delivery message is then transmitted to the user computing device. The virtual currency delivery message includes the virtual currency amount that the user purchased from the merchant and a virtual currency identifier associated with the purchased virtual currency.

As the user proceeds through the mobile event they may desire to exchange the virtual currency for goods or services offered by the merchant. To exchange the purchased virtual currency (both virtual currency purchased at the mobile event, and virtual currency purchased prior to arriving at the mobile event), the user may assign virtual currency to the merchant when the user mobile device communicates with the merchant mobile device using the methods described herein. In the exemplary embodiment, the merchant computing device receives a virtual currency assignment message from the user computing device. The virtual currency assignment message includes an amount of virtual currency to be transferred from the user computing device to the merchant computing device and a virtual currency identifier being assigned. The user is also able to redeem their purchased and unused virtual currency with the merchant at any point, using a virtual currency assignment message.

The MEP system receives a virtual currency assignment message from the merchant, including an account identifier associated with the merchant. The virtual currency assignment message includes assigned virtual currency and the at least one assigned virtual currency identifier, wherein the assigned virtual currency is an amount of virtual currency assigned from the user to the merchant at, or in relation to the merchant's mobile event.

The MEP system then verifies that the virtual currency identifier associated with the assigned virtual currency matches the virtual currency identifier of the virtual currency associated with the user account. If a match exists (indicating that the assigned virtual currency originated from the user's account), the MEP system removes the assigned virtual currency from the virtual currency balance of the account associated with the user identifier and adds the amount of assigned virtual currency to the virtual currency balance of the account associated with the merchant, completing the electronic transaction.

In another example, a user registered with the MEP system, visits a mobile event where the merchant does not have a mobile device or other device connected to a network. The user has purchased virtual currency for the event, which has been delivered to the user's mobile device, as described above. As the user proceeds through the mobile event they may desire to exchange the virtual currency for goods or services offered by the merchant. To exchange the virtual currency stored on their mobile device, the user presents the user mobile device to the merchant. The merchant is able to assign virtual currency to themselves in return for goods or services by inputting to the user's mobile device the account identifier associated with the merchant and selecting virtual currency, stored on the user mobile device, the selected virtual currency including the virtual currency identifier. The user is able to repeat this process at each desired point of exchange with the merchant.

At any point following assignment of the virtual currency to the merchant, the MEP system may receive a virtual currency assignment message from the user, including an account identifier associated with the merchant. The virtual currency assignment message includes the assigned virtual currency and the at least one assigned virtual currency identifier, wherein the assigned virtual currency is an amount of virtual currency assigned by the user to the merchant in exchange for goods or services at the merchant's mobile event.

The MEP system then verifies that the virtual currency identifier associated with the assigned virtual currency matches the virtual currency identifier of the virtual currency associated with the user account. If a match exists (indicating that the assigned virtual currency originated from the user's account), the MEP system removes the assigned virtual currency from the virtual currency balance of the account associated with the user identifier and adds the amount of assigned virtual currency to the virtual currency balance of the account associated with the merchant, completing the electronic transaction.

In yet another example, a customer learns of an upcoming carnival that will be taking place at a local pumpkin patch. The customer is registered for the MEP service, as is the merchant in charge of the carnival. The customer locates the upcoming event through an interface with the MEP system and is able to submit a virtual currency delivery message, including their MEP account identifier, requesting to have a quantity of virtual currency for the carnival delivered to their mobile device for use at the carnival. The customer may have already had a balance of virtual currency present in their account, or they may use their pre-loaded payment credentials to purchase a desired quantity of virtual currency for the carnival. The merchant is able to customize the virtual currency for their events, including naming and adding visual effects to its appearance when viewed on a user mobile device. A MEP computing device of the MEP system transmits a virtual currency delivery message to the mobile device associated with the customer's account, the message including the requested virtual currency and the virtual currency identifier.

In the same example, when the customer arrives at the carnival, they may present their mobile device containing the purchased virtual currency to the merchant at each point of interaction with the merchant where tickets or currency would typically be exchanged between the customer and the merchant. When the customer presents the mobile device containing the purchased virtual currency to the merchant, the merchant is able to assign quantities of the virtual currency stored on the customer's mobile device to the merchant's account by entering a unique identifier associated with the merchant's account. The quantity of virtual currency assigned to the merchant at each interaction with the customer is representative of the value of the good or service that the customer is exchanging the virtual currency for. Once the merchant inputs their unique identifier and selects a quantity of virtual currency, that quantity of virtual currency becomes unavailable to the customer. Because the virtual currency is stored on the user's computing device throughout the transaction process, the customer is able to assign the previously purchased virtual currency to the merchant in exchange for goods or services while at the carnival regardless of network coverage/service or available merchant computing devices. After the customer has visited the carnival, or at any time that a network connection is present, the customer's mobile device is able to exchange any virtual currency that was assigned to the merchant by sending a virtual currency assignment message including the assigned virtual currency and an account identifier associated with the merchant to the MEP system. The customer is also able to redeem for value any unused amount of virtual currency by sending a virtual currency return message through their MEP interface, the virtual currency return message including the unused virtual currency and associated virtual currency identifiers.

In a second example, a customer and his family are attending a local festival and the customer would like to purchase tickets for himself and his family to exchange for food and miscellaneous events at the festival. The customer registers with the MEP service, provides the required information, such as his payment credentials, including the information from a payment card, and downloads an MEP application on his mobile device. When the customer arrives at the festival, the customer initiates the communication link between his mobile device and the merchant's mobile device utilizing NFC, the merchant also having registered for the MEP service as a merchant user. The customer determines a quantity of tickets/tokens/virtual currency that he and his family will likely use during their time at the festival and submits a virtual currency request message to the merchant via the merchant/user computing devices NFC link that was previously established. The merchant receives the virtual currency request message on his mobile device, which includes the customer's transaction data, including the customer's account number, payment credential data, and the requested quantity of virtual currency. In response, the merchant transmits a virtual currency delivery message to the customer's mobile device, the message containing the requested virtual currency and the virtual currency identifier to assist in tracking the virtual currency. The customer receives the requested virtual currency and is now able to communicate with his family's other mobile devices to transfer portions of the requested virtual currency, if desired, to other family member devices so that the family can split up and attend various aspects of the festival. To enter an event or purchase food, each mobile device containing a portion of the virtual currency establishes communication with a merchant mobile device utilizing NFC and sends a virtual currency assignment message to the merchant mobile device. The virtual currency assignment message contains the amount of virtual currency required to complete the purchase as well as the virtual currency identifier being assigned. At the completion of the festival, or when a network connection becomes available, the merchant is able to communicate with the MEP system to exchange the assigned virtual currency for the currency of his choice.

The methods and systems described herein may be implemented using computer programming or engineering techniques including computer software, firmware, hardware, or any combination or subset thereof, wherein the technical effects may be achieved by: (i) storing, within a memory device, a user profile and a merchant profile for exchanging virtual currency, each profile including a virtual currency balance including the virtual currency identifier, and an associated user account identifier, the user profile further including payment credential data associated with the user, and a user mobile device identifier; (ii) receiving a virtual currency delivery message associated with a user account identifier, the virtual currency delivery message including a virtual currency request and an input mobile device identifier; (iii) transmitting a virtual currency delivery message to the mobile device associated with the mobile device identifier when the input mobile device identifier matches the mobile device identifier associated with the user account identifier in the user profile, wherein the message includes the requested virtual currency including the virtual currency identifier; (iv) receiving a virtual currency assignment message including an account identifier associated with the merchant, the virtual currency assignment message including assigned virtual currency including at least one assigned virtual currency identifier, wherein the assigned virtual currency is an amount of virtual currency assigned by the user to the merchant; (v) removing the assigned virtual currency from the virtual currency balance of the account associated with the user when the at least one assigned virtual currency identifier matches the virtual currency identifier associated with the user profile; (vi) adding the assigned virtual currency to the virtual currency of the account associated with the merchant profile; (vii) receiving, at a merchant computing device, a virtual currency request message including transaction data from a user, the transaction data including an account number associated with a user, payment credential data associated with the user, and a requested quantity of virtual currency; (viii) transmitting, to a user computing device, a virtual currency delivery message, wherein the virtual currency delivery message includes the requested virtual currency and the virtual currency identifier associated with the requested virtual currency; (ix) receiving, at the merchant computing device, a virtual currency assignment message including an account identifier associated with the user, the virtual currency assignment message including assigned virtual currency including at least one assigned virtual currency identifier, wherein the assigned virtual currency is an amount of virtual currency assigned by the user to the merchant; and (x) storing, within a database coupled to the merchant computing device, the transaction data including the user account number.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer-readable medium.

In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom).

In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.;

Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party payment card processing system 120 for enabling payment-by-card transactions between merchants 124, cardholders 122, and issuer banks 130. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In the payment card processing system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." Cardholder 122 tenders payment for a purchase with a transaction card and merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 212 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases tickets to a mobile event, such as a carnival, a concert, a fair, and/or another type of festival, at least partial itinerary information is transmitted during the clearance process as transaction data. When interchange network 128 receives the itinerary information, interchange network 128 routes the itinerary information to database 212.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

In some embodiments, cardholder 122 registers one or more payment cards with a digital wallet. Having done this, cardholder 122 can interact with a participating online merchant 124. At the check-out stage, online merchant 124 displays a button on the merchant website which cardholder 122 can click on in order to make a payment using the cardholder's digital wallet. Online merchant 124 then redirects the user to a "switch" operated by interchange network 128. Using a cookie located on the cardholder's computer, the "switch" is able to determine which wallet-hosting server hosts a wallet associated with cardholder 122. The switch then establishes a connection between the cardholder's computer and the appropriate wallet-hosting system, which presents cardholder 122 with a sign-in page (e.g., as a pop-up window), where there is an authentication process (e.g., entry of a pre-agreed password). This log-in process may use the same login credentials (e.g., password) which the user also uses to obtain access to other online banking activities.

The wallet-hosting system then securely transfers the cardholder's payment information to the online merchant's domain. The merchant's domain submits the cardholder's payment information to acquiring merchant bank 126 for a separate authorization process in which the acquiring domain communicates with the issuing bank 130 to ask the bank to authorize the transaction. Thus, cardholder 122 is not required to enter their card details (except at the stage of initially registering with the wallet-hosting system), and the online transaction process is streamlined with only a single redirection, and consistent branding for the entire payment process, irrespective of the online merchant 124.

In some embodiments, a unique identifier is provided to cardholder 122. The unique identifier is different from the cardholder's account number. In these embodiments, interchange network 128 stores the unique identifier in database 212 along with cardholder account 132. When interchange network 128 receives the unique identifier, interchange network 128 determines the associated cardholder account 132 and uses that information in processing the payment transaction.

In come embodiments, multi-party payment card processing system 120 includes a virtual currency exchange system 200 including an event payment (MEP) computing system 202 in communication with components of system 100 over interchange network 128 and cardholder 122 over a second network (e.g., the internet). In the example embodiment, MEP computing system 202 is configured to enable exchange of virtual currency between a cardholder 122 and a merchant 124 at a mobile event, as is described below in more detail.

Figure 2:
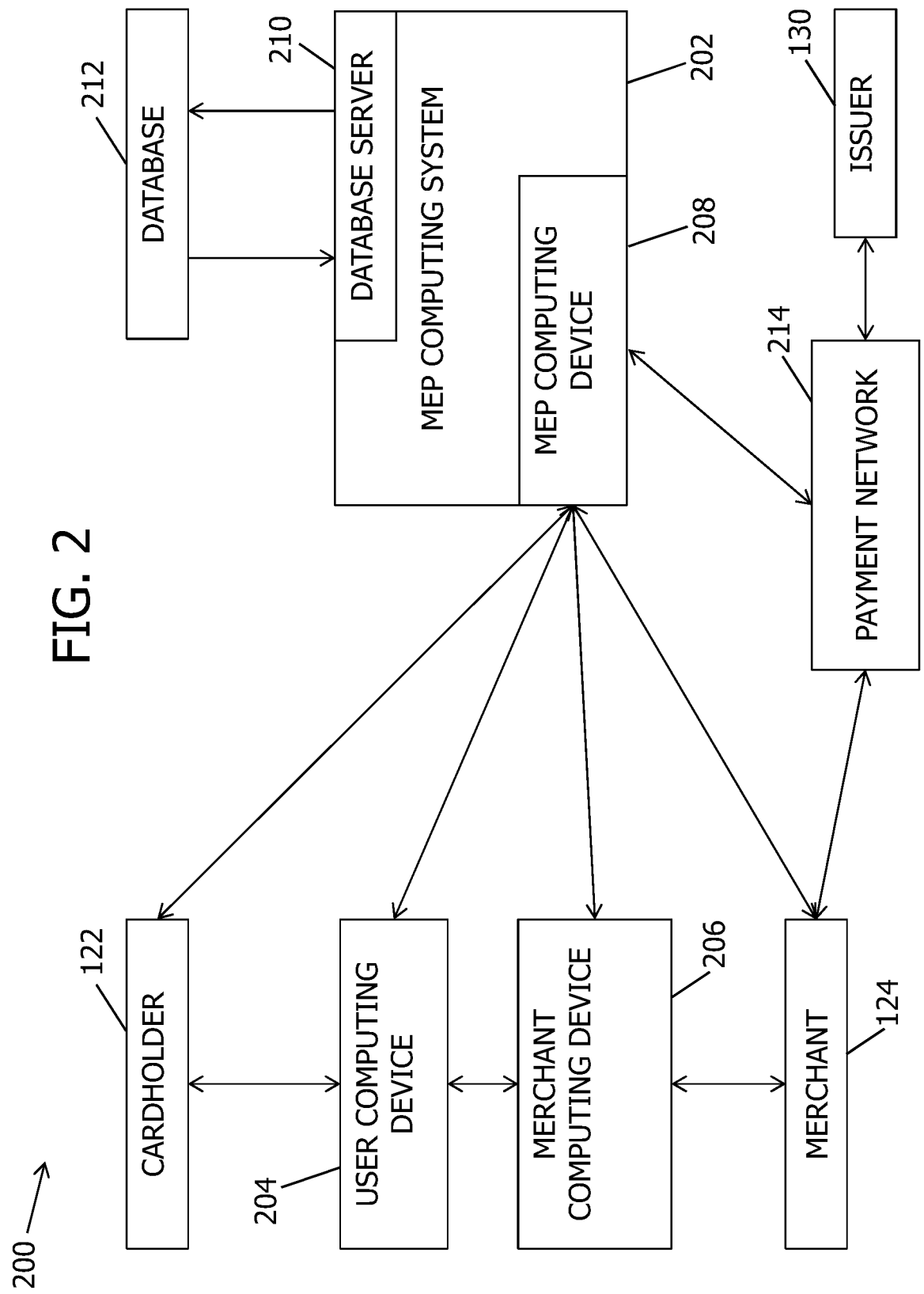

FIG. 2 is a simplified block diagram of an example virtual currency exchange system 200 used for enabling virtual currency exchange as part of a payment transaction. In the example embodiment, virtual currency exchange system 200 may be used for a mobile device-to-mobile device purchase service in accordance with one embodiment of the present disclosure. Virtual currency exchange system 200 can be utilized by users as part of a process of initiating an authorization request and performing a transaction as described herein.

In addition, virtual currency exchange 200 is a virtual currency exchange system including MEP computing system 202, which a user may use to conduct electronic transactions related to the purchase of a merchant's goods or services at a mobile event. As described below in more detail, MEP computing system 202 is configured to: (i) store, within the memory device, a user profile and a merchant profile for exchanging virtual currency, each profile including a virtual currency balance including the virtual currency identifier, and an associated user account identifier, the user profile further including payment credential data associated with the user, and a user mobile device identifier; (ii) receive a virtual currency delivery message associated with a user account identifier, the virtual currency delivery message including a virtual currency request and an input mobile device identifier; (iii) transmit a virtual currency delivery message to the mobile device associated with the mobile device identifier when the input mobile device identifier matches the mobile device identifier associated with the user account identifier in the user profile, wherein the virtual currency delivery message includes the requested virtual currency including the virtual currency identifier; (iv) receive a virtual currency assignment message including an account identifier associated with the merchant, the virtual currency assignment message including assigned virtual currency including at least one assigned virtual currency identifier, wherein the assigned virtual currency is an amount of virtual currency assigned by the user to the merchant; (v) remove the amount of assigned virtual currency from the virtual currency balance of the account associated with the user when the at least one assigned virtual currency identifier matches the virtual currency identifier associated with the user profile; and (vii) add the assigned virtual currency to the virtual currency of the account associated with the merchant profile.

Additionally, virtual currency exchange system 200 includes a computer implemented method for initiating a virtual currency transaction between a user computing device and a merchant computing device for purchasing goods and services at a mobile event. As described below in more detail, virtual currency exchange system 200 is also configured to enable: (i) receiving, at a merchant computing device, a virtual currency request message including transaction data from a user, the transaction data including an account number associated with a user, payment credential data associated with the user, and a requested quantity of virtual currency; (ii) transmitting, to a user computing device, a virtual currency delivery message, wherein the virtual currency delivery message includes the requested virtual currency and the virtual currency identifier associated with the requested virtual currency; (iii) receiving, at the merchant computing device, a virtual currency assignment message including an account identifier associated with the user, the virtual currency assignment message including assigned virtual currency including at least one assigned virtual currency identifier, wherein the assigned virtual currency is an amount of virtual currency assigned by the user to the merchant; and (iv) storing, within a database coupled to the merchant computing device, the transaction data including the user account number.

The resulting technical effect is that a mobile event payment system for processing virtual currency exchanges between the user and the merchant provides a user and merchant-friendly payment system that is not dependent on a payment network or continuous network connection.

In the example embodiment, a user computing device 204 and a merchant computing device 206 are smartphones that include a web browser and/or a software application the enable user computing device 204 and merchant computing device 206 to receive data from MEP computing device 208 of MEP computing system 202 and to send data to MEP computing device 208 using the internet and/or a type of data service. More specifically, user computing device 204 and merchant computing device 206 may be communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. User computing device 204 and merchant computing device 206 can be any device capable of accessing the Internet including, but not limited to, a desktop computer, a laptop computer, a personal digital assistant (PDA), a cellular phone, a tablet, a phablet, or other web-based connectable equipment. In the example embodiment, cardholder 122 uses user computing device 204 to access a commerce website for merchant 124, to communicate with MEP computing device 208, and to communicate with merchant 124 at the mobile event. Merchant 124 uses merchant computing device 206 to communicate with cardholder 122 at the mobile event and to communicate with MEP computing device 208.

A database server 210 is communicatively coupled to a database 212 that stores data. In one embodiment, database 212 includes a user profile, a merchant profile, a virtual currency balance for each account including the virtual currency identifier, an associated user account identifier, and a mobile device identifier. In the example embodiment, database 212 is stored remotely from MEP computing device 208. In some embodiments, database 212 is decentralized. In the example embodiment, a person can access database 212 via user computing device 204 or merchant computing device 206 by logging onto MEP computing device 208, as described herein.

MEP computing device 208 is communicatively coupled with a payment network 214. Payment network 214 represents one or more parts of payment network 120 (shown in FIG. 1). In the example embodiment, MEP computing device is in communication with one or more computing devices associated with interchange network 128. In other embodiments, MEP computing device 208 is in communication with one or more computing devices associated with merchant 124, merchant bank 126 (shown in FIG. 1), or issuer bank 130 (shown in FIG. 1). In some embodiments, MEP computing device 208 may be associated with, or is part of payment network 120, or in communication with payment network 120, shown in FIG. 1. In other embodiments, MEP computing device 208 is associated with a third party and is in communication with payment network 120. In some embodiments MEP computing device 208 may be associated with, or be part of merchant bank 126, interchange network 128, and issuer bank 130. In addition, MEP computing device 208 is communicatively coupled with merchant 124. In the example embodiment, MEP computing device 208 is in communication with merchant computing device 206 and user computing device 204 via Application Programming Interface (API) calls. Through the API call, merchant 124 and cardholder 122 may transmit information to and receive information from MEP computing device 208.

In the example embodiment, cardholder 122 and merchant 124 are in communication with MEP computing device 208, which stores user and merchant profile information including a virtual currency balance amount, an associated user account identifier, and a mobile device identifier. In the example embodiment, the MEP computing device 208 receives a virtual currency delivery message associated with the user account identifier. The virtual currency delivery message includes a virtual currency request amount and an input mobile device identifier. Cardholder 122 is able to request virtual currency for merchant's 124 mobile event prior to attending the mobile event through the use of the virtual currency delivery message. MEP computing device 208 compares the input user computing device identifier with the user computing device identifier associated with cardholder's 122 account identifier in cardholder's 122 profile, and transmits a virtual currency delivery message to user computing device 204 associated with the user computing device identifier in the user profile if the two identifiers match. The virtual currency delivery message includes the withdrawn virtual currency request amount and a virtual currency identifier. In an alternative embodiment, MEP computing device 208 transmits a virtual currency delivery message to at least a second mobile device associated with cardholder's 122 profile at the request of cardholder 122.

In the exemplary embodiment, after receiving the virtual currency delivery message, or potentially before purchasing any virtual currency, cardholder 122 enters merchant's 124 mobile event location, such as a carnival, and initiates an electronic transaction with the merchant 124 (e.g., via near field communication) using user computing device 204. User computing device 204 is detected by merchant computing device 206 and establishes communication over a wireless connection, such as a near field communications system. In the example embodiment, user computing device 204 and merchant computing device 206 communicate using a passive wireless connection. In another embodiment, merchant computing device 206 communicates with user computing device 204 using an active wireless connection. In yet another embodiment, cardholder 122 presents user computing device 204 to merchant 124, who enters a merchant code that assigns a certain quantity of virtual currency to merchant 124 and makes the assigned virtual currency unavailable to cardholder 122.

After user computing device 204 and merchant computing device 206 have established a communication connection, and if cardholder 122 desires to purchase virtual currency, merchant computing device 206 receives a virtual currency request message from cardholder 122. The virtual currency request message includes transaction data from cardholder 122 including an account number associated with cardholder 122, payment credential data associated with cardholder 122, and a virtual currency purchase amount. Following a request from cardholder 122 to purchase virtual currency via a virtual currency request message, a virtual currency delivery message is then transmitted to user computing device 204. The virtual currency delivery message includes the virtual currency amount that cardholder 122 purchased from merchant 124 and a virtual currency identifier associated with the purchased virtual currency. In the example embodiment, the virtual currency identifier includes at least one of a user-specific PIN, a password, a pattern code, a digital signature, a biometric signature, an answer to a challenge question, and a two-dimensional bar code.

As cardholder 122 proceeds through the mobile event they may desire to exchange the virtual currency for goods or services offered by merchant 124. To exchange the purchased virtual currency (both that purchased at the mobile event, and that purchased prior to arriving at the mobile event), user computing device 204 communicates with merchant computing device 206 using methods described herein. In the exemplary embodiment, merchant computing device 206 receives a virtual currency assignment message from user computing device 204. The virtual currency assignment message includes an amount of virtual currency to be assigned from cardholder 122 to merchant 124 and a virtual currency identifier being assigned. Additionally, cardholder 122 may redeem the virtual currency stored on user computing device 204 by transmitting a virtual currency return message from user computing device 204, wherein the virtual currency return message includes an amount of virtual currency to be redeemed by the user with the merchant.

In the example embodiment, after cardholder 122 has assigned virtual currency to merchant 124 and the virtual currency is stored on merchant computing device 206, MEP computing device 208 receives a virtual currency assignment message from merchant 124, including an account identifier associated with merchant 124. The virtual currency assignment message includes an assigned virtual currency amount and the virtual currency identifier, wherein the assigned virtual currency is an amount of virtual currency assigned from cardholder 122 to merchant 124 at, or in relation to merchant's 124 mobile event. In other embodiments, MEP computing device receives a virtual currency assignment message from cardholder 122 in order for cardholder 122 to redeem unused virtual currency not assigned to merchant 124.

In the example embodiment, MEP computing device 208 then verifies that the virtual currency identifier associated with the assigned virtual currency matches the virtual currency identifier of the virtual currency associated with cardholder's 122 account. If a match exists (indicating that the assigned virtual currency originated from cardholder's 122 account), MEP computing device 208 removes the assigned virtual currency from the virtual currency balance of the account associated with cardholder 122's account identifier and adds the amount of assigned virtual currency to the virtual currency balance of the account associated with merchant 124, completing the electronic transaction.

In other embodiments, MEP computing device 208 processes a MEP recommendation operation. MEP computing device 208 detects merchants 124 that are registered for the MEP service by performing a lookup of a list of merchant profiles stored in database 212. MEP computing device 208 compares user transaction data with the list of merchants 124 registered for the MEP service, and suggests to cardholder 122 potential mobile events of registered and participating merchants 124 based on merchants 124 that cardholder 122 has previously interacted with. In other additional embodiments, MEP computing device 208 transmits a virtual currency balance message to user computing device 204 associated with cardholder 122. The virtual currency balance message includes the total amount of virtual currency associated with cardholder's 122 account at the time the virtual currency message is transmitted.

Figure 3:
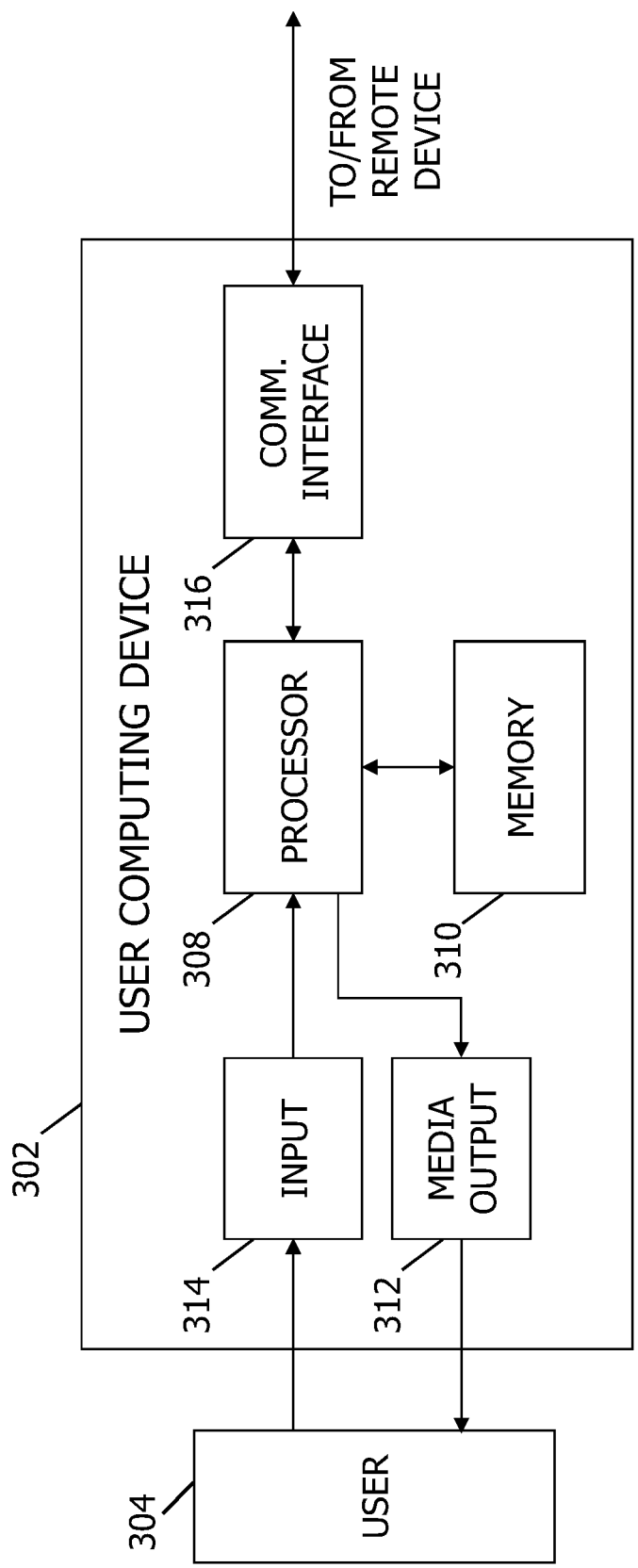

FIG. 3 illustrates an example configuration of a user computing device 204 and a merchant computing device 206 shown in FIG. 2, in accordance with one embodiment of the present disclosure. A user computing device 302 is operated by a user 304. In an alternative embodiment computing device 302 is a merchant computing device 206 operated by a merchant 124. User computing device 302 may include, but is not limited to, computing devices associated with cardholder 122 (shown in FIG. 1). User computing device 302 includes a processor 308 for executing instructions. In some embodiments, executable instructions are stored in a memory area 310. Processor 308 may include one or more processing units (e.g., in a multi-core configuration). Memory area 310 is any device allowing information such as executable instructions and/or transaction data to be stored and retrieved. Memory area 310 may include one or more computer-readable media.

User computing device 302 also includes at least one media output component 312 for presenting information to user 304. Media output component 312 is any component capable of conveying information to user 304. In some embodiments, media output component 312 includes an output adapter (not shown) such as a video adapter and/or an audio adapter. An output adapter is operatively coupled to processor 308 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 312 is configured to present a graphical user interface (e.g., a web browser and/or a client application) to user 304. A graphical user interface may include, for example, an online store interface for viewing and/or purchasing items, and/or a wallet application for managing payment information. In some embodiments, user computing device 302 includes an input device 314 for receiving input from user 304. User 304 may use input device 314 to, without limitation, select and/or enter one or more items to purchase and/or a purchase request, or to access credential information, and/or payment information. Input device 314 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 312 and input device 314.

User computing device 302 may also include a communication interface 316, communicatively coupled to a remote device such as MEP computing device 208 (shown in FIG. 2). Communication interface 316 may include, for example, a wired or wireless network adapter and/or a wireless data transceiver for use with a mobile telecommunications network.

Stored in memory area 310 are, for example, computer-readable instructions for providing a user interface to user 304 via media output component 312 and, optionally, receiving and processing input from input device 314. The user interface may include, among other possibilities, a web browser and/or a client application. Web browsers enable users, such as user 304, to display and interact with media and other information typically embedded on a web page or a website from MEP computing device 208. A client application allows user 304 to interact with, for example, MEP computing device 208. For example, instructions may be stored by a cloud service and the output of the execution of the instructions sent to the media output component 312.

Figure 4:
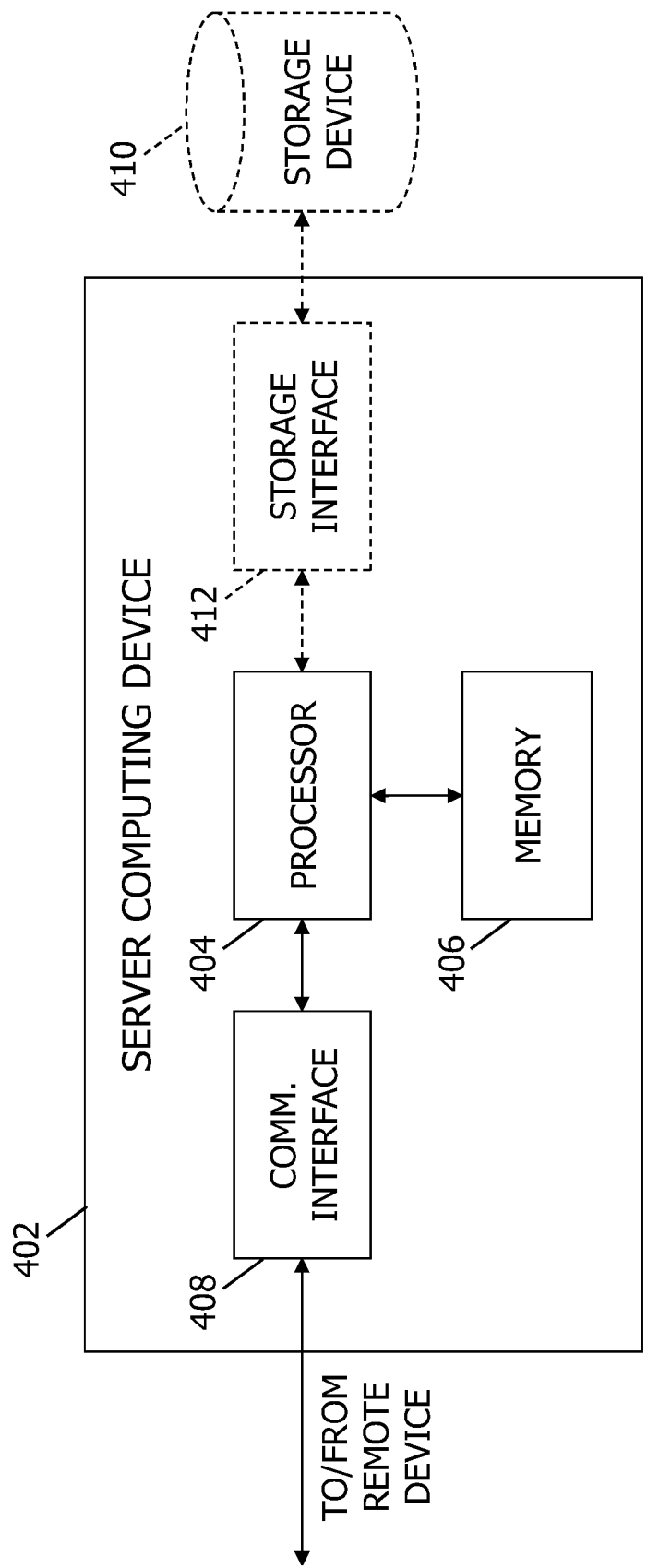

FIG. 4 illustrates an example configuration of a server system shown in FIG. 2, in accordance with one embodiment of the present disclosure. Server computing device 402 may include, but is not limited to, database server 210, and MEP computing device 208 (all shown in FIG. 2). Server computing device 402 also includes a processor 404 for executing instructions. Instructions may be stored in a memory area 406. Processor 404 may include one or more processing units (e.g., in a multi-core configuration). Processor 404 is operatively coupled to a communication interface 408 such that server computing device 402 is capable of communicating with a remote device such as another server computing device 402, user computing device 204, or MEP computing device 208 (all shown in FIG. 2). For example, communication interface 408 may receive requests from user computing device 204 via the Internet.

Processor 404 may also be operatively coupled to a storage device 410. Storage device 410 is any computer-operated hardware suitable for storing and/or retrieving data, such as, but not limited to, data associated with database 212 (shown in FIG. 2). In some embodiments, storage device 410 is integrated in server computing device 402. For example, server computing device 402 may include one or more hard disk drives as storage device 410. In other embodiments, storage device 410 is external to server computing device 402 and may be accessed by a plurality of server computing devices 402. For example, storage device 410 may include a storage area network (SAN), a network attached storage (NAS) system, and/or multiple storage units such as hard disks and/or solid state disks in a redundant array of inexpensive disks (RAID) configuration.

In some embodiments, processor 404 is operatively coupled to storage device 410 via a storage interface 412. Storage interface 412 is any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Processor 404 executes computer-executable instructions for implementing aspects of the disclosure. In some embodiments, processor 404 is transformed into a special purpose microprocessor by executing computer-executable instructions or by otherwise being programmed. For example, processor 404 is programmed with the instructions such as are illustrated in FIG. 5.

Figure 5:
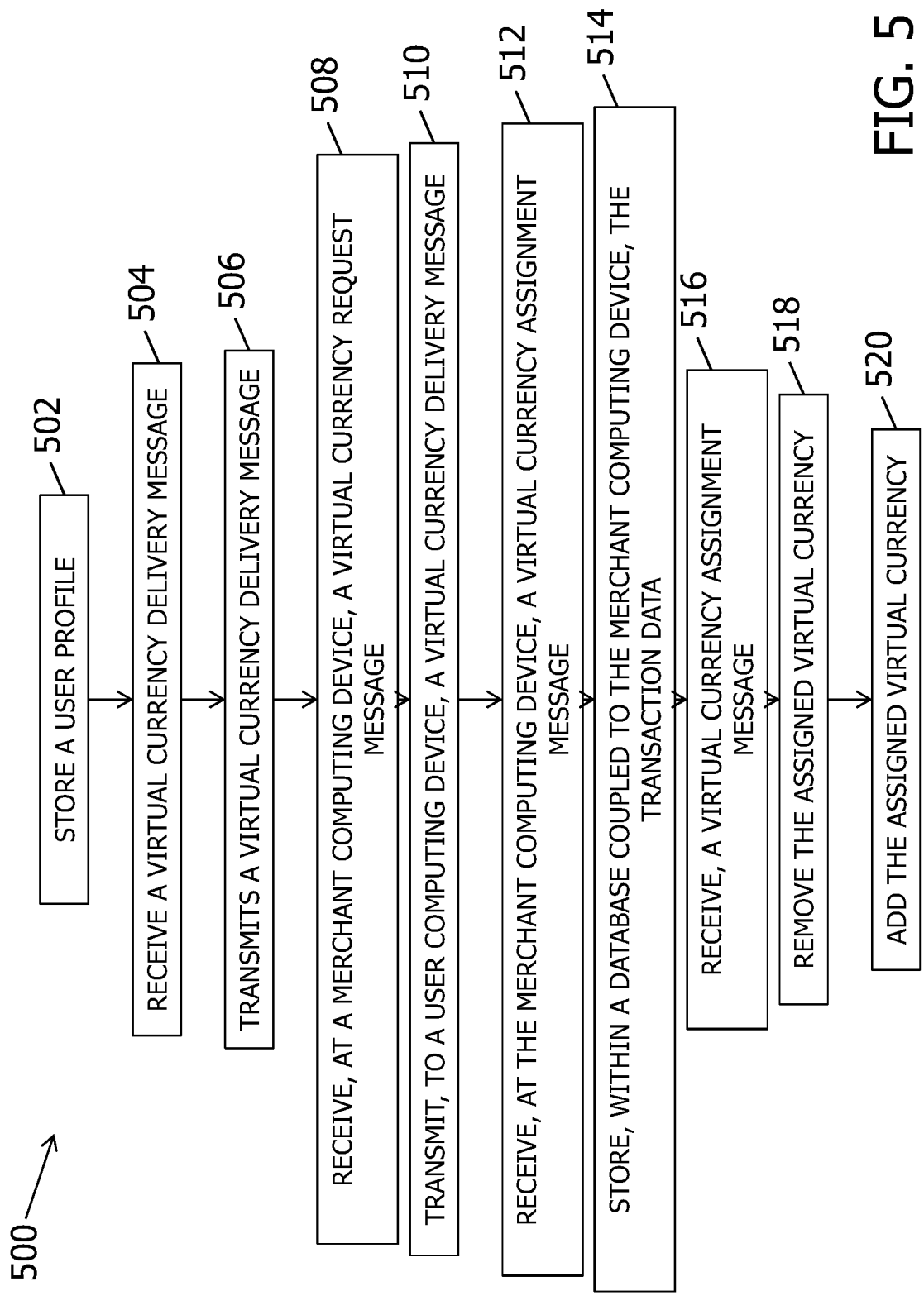

FIG. 5 is a flowchart illustrating an exemplary method 500 for using a mobile event payment computing device, such a MEP computing system 202 (shown in FIG. 2), when performing a virtual currency exchange as part of a payment transaction in accordance with one embodiment of the present disclosure. In one embodiment, method 500 may be implemented by virtual currency exchange system 200 (shown in FIG. 2).

In the example embodiment, MEP computing device 208 stores 502 a user profile and a merchant profile for exchanging virtual currency, each profile including a quantity of virtual currency including the virtual currency, and associated user account identifier, and a mobile device identifier.

In the example embodiment, MEP computing device 208 receives 504 a virtual currency delivery message associated with a user account identifier, the virtual currency delivery message including a virtual currency request and an input mobile device identifier. In the example embodiment, MEP computing device 208 transmits 506 a virtual currency delivery message to the mobile device associated with the mobile device identifier when the input mobile device identifier matches the mobile device identifier associated with the user account identifier in the user profile, wherein the virtual currency delivery message includes the requested virtual currency including the virtual currency identifier.

In the example embodiment, method 500 further includes receiving 508, at a merchant computing device, a virtual currency request message including transaction data from a user, the transaction data including an account number associated with a user, payment credential data associated with the user, and a requested quantity of virtual currency. In the example embodiment, method 500 further includes transmitting 510, to a user computing device, a virtual currency delivery message, wherein the virtual currency delivery message includes the requested virtual currency and the virtual currency identifier associated with the requested virtual currency.

In the example embodiment, method 500 further includes receiving 512, at the merchant computing device, a virtual currency assignment message including a quantity of assigned virtual currency including the virtual currency identifier associated with the assigned virtual currency. In the example embodiment, method 500 further includes storing 514, within a database coupled to the merchant computing device, the transaction data including the user account number. In the example embodiment, MEP computing device 208 receives 516 a virtual currency assignment message including an account identifier associated with the merchant, the virtual currency assignment message including an amount of assigned virtual currency including the virtual currency identifier, wherein the assigned virtual currency is an amount of virtual currency assigned from the user to the merchant.

In the example embodiment, MEP computing device 208 removes 518 the assigned virtual currency from the virtual currency balance of the account associated with the user when the at least one assigned virtual currency identifier matches the virtual currency identifier in the user profile. In the example embodiment, MEP computing device 208 adds 520 the assigned virtual currency to the virtual currency of the account associated with the merchant profile.

Figure 6:
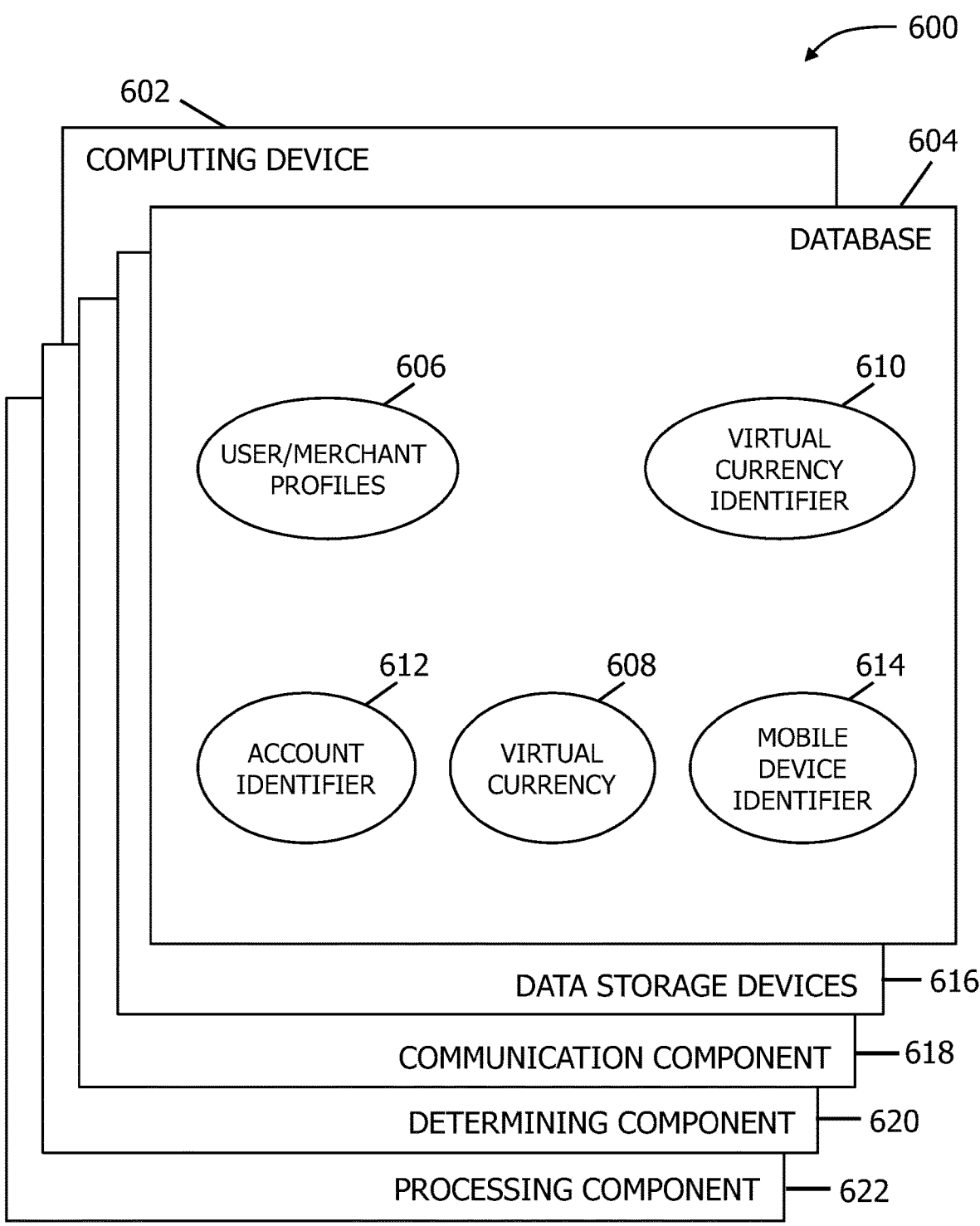

FIG. 6 is a diagram 600 of components of one or more example computing devices that may be used in virtual currency exchange system 200 shown in FIG. 2. In some embodiments, computing device 602 is similar to MEP computing device 208 (shown in FIG. 2). Database 604 may be coupled with several separate components within computing device 602, which perform specific tasks. In this embodiment, database 604 includes user/merchant profiles 606, virtual currency 608, virtual currency identifier 610, account identifier 612, mobile device identifier 614. In some embodiments, database 604 is similar to database 212 (shown in FIG. 2).

Computing device 602 includes database 604, as well as data storage devices 616. Computing device 602 also includes a communication component 618 for receiving 504 a virtual currency delivery message, transmitting 506 a virtual currency delivery message, and receiving 516 a virtual currency assignment message (all shown in FIG. 5). Computing device 602 also includes a determining component 620 for determining whether the assigned virtual currency identifier matches the virtual currency identifier in the user's profile as part of removing 518 assigned virtual currency from an account (shown in FIG. 5). A processing component 622 assists with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A computer-implemented method for initiating a virtual currency exchange between a user computing device and a merchant computing device associated with a merchant, the computer-implemented method comprising steps performed by the merchant computing device of:
    a) receiving, from the user computing device via a near-field communication (NFC) channel, a virtual currency request message from a user, the virtual currency request message including a user account identifier associated with an account of a user, payment credential data associated with the user, and a request for an amount of virtual currency to be delivered;
    b) transmitting, to the user computing device via the NFC channel, a delivery message delivering the requested amount of virtual currency;
    c) receiving, from the user computing device, a user assignment message including the user account identifier, wherein the user assignment message assigns to the merchant an amount of assigned virtual currency from the delivered amount of virtual currency, and wherein each of steps a, b, and c is performed while the merchant computing device is in a first physical location;
    storing within a mobile event payment (MEP) database coupled to the merchant computing device, the user account identifier and the assigned virtual currency; and
    subsequent to steps a, b, and c:
        connecting, while the merchant computing device is at a second physical location, to a payment network; and
        transmitting, to a virtual currency payment system via the payment network, an assignment completion message including the user account identifier, a merchant account identifier associated with the merchant, and the assigned virtual currency.

2. The computer-implemented method in accordance with claim 1 wherein the delivery message identifies a type of the delivered virtual currency.

3. The computer-implemented method in accordance with claim 2 wherein the identified type of the delivered virtual currency is usable only with the merchant.

4. The computer-implemented method in accordance with claim 2 wherein the identified type of the delivered virtual currency is a ticket for use at an event at the first physical location.

5. The computer-implemented method in accordance with claim 1 wherein the NFC channel is a passive wireless connection established in response to wirelessly detecting the user computing device.

6. The computer-implemented method in accordance with claim 1 wherein the NFC channel is established with a first merchant mobile device, the first merchant mobile device in communication with the merchant computing device at the first physical location.

7. The computer-implemented method in accordance with claim 6 wherein the user assignment message is received via a second NFC channel established with a second merchant mobile device, the second merchant mobile device being different from the first merchant mobile device and in communication with the merchant computing device at the first physical location.

8. A merchant computing device associated with a merchant and comprising a processor communicatively coupled to a memory device, said processor programmed to perform steps for initiating a virtual currency exchange between a user computing device and a merchant computing device, the steps comprising:
    a) receiving, from the user computing device via a near-field communication (NFC) channel, a virtual currency request message from a user, the virtual currency request message including a user account identifier associated with an account of a user, payment credential data associated with the user, and a request for an amount of virtual currency to be delivered;
    b) transmitting, to the user computing device via the NFC channel, a delivery message delivering the requested amount of virtual currency;
    c) receiving, from the user computing device, a user assignment message including the user account identifier, wherein the user assignment message assigns to the merchant an amount of assigned virtual currency from the delivered amount of virtual currency, and wherein each of steps a, b, and c is performed while the merchant computing device is in a first physical location;
    storing within a mobile event payment (MEP) database coupled to the merchant computing device, the user account identifier and the assigned virtual currency; and
    subsequent to steps a, b, and c:
        connecting, while the merchant computing device is at a second physical location, to a payment network; and
        transmitting, to a virtual currency payment system via the payment network, an assignment completion message including the user account identifier, a merchant account identifier associated with the merchant, and the assigned virtual currency.

9. The merchant computing device in accordance with claim 8 wherein the delivery message identifies a type of the delivered virtual currency.

10. The merchant computing device in accordance with claim 9 wherein the identified type of the delivered virtual currency is usable only with the merchant.

11. The merchant computing device in accordance with claim 9 wherein the identified type of the delivered virtual currency is a ticket for use at an event at the first physical location.

12. The merchant computing device in accordance with claim 8 wherein the NFC channel is a passive wireless connection established in response to wirelessly detecting the user computing device.

13. The merchant computing device in accordance with claim 8 wherein the NFC channel is established with a first merchant mobile device, the first merchant mobile device in communication with the merchant computing device at the first physical location.

14. The merchant computing device in accordance with claim 13 wherein the user assignment message is received via a second NFC channel established with a second merchant mobile device, the second merchant mobile device being different from the first merchant mobile device and in communication with the merchant computing device at the first physical location.

15. At least one non-transitory computer-readable storage medium comprising instructions for initiating a virtual currency exchange between a user computing device and a merchant computing device associated with a merchant, the instructions being executable by a processor of a merchant computing device to cause the processor to perform steps comprising:
   a) receiving, from the user computing device via a near-field communication (NFC) channel, a virtual currency request message from a user, the virtual currency request message including a user account identifier associated with an account of a user, payment credential data associated with the user, and a request for an amount of virtual currency to be delivered;
   b) transmitting, to the user computing device via the NFC channel, a delivery message delivering the requested amount of virtual currency;
   c) receiving, from the user computing device, a user assignment message including the user account identifier, wherein the user assignment message assigns to the merchant an amount of assigned virtual currency from the delivered amount of virtual currency, and wherein each of steps a, b, and c is performed while the merchant computing device is in a first physical location;

storing within a mobile event payment (MEP) database coupled to the merchant computing device, the user account identifier and the assigned virtual currency; and subsequent to steps a, b, and c:
      connecting, while the merchant computing device is at a second physical location, to a payment network; and
      transmitting, to a virtual currency payment system via the payment network, an assignment completion message including the user account identifier,
   a merchant account identifier associated with the merchant, and the assigned virtual currency.

16. The at least one non-transitory computer-readable storage medium in accordance with claim 15 wherein the delivery message identifies a type of the delivered virtual currency.

17. The at least one non-transitory computer-readable storage medium in accordance with claim 16 wherein the identified type of the delivered virtual currency is usable only with the merchant.

18. The at least one non-transitory computer-readable storage medium in accordance with claim 16 wherein the identified type of the delivered virtual currency is a ticket for use at an event at the first physical location.

19. The at least one non-transitory computer-readable storage medium in accordance with claim 15 wherein the NFC channel is a passive wireless connection established in response to wirelessly detecting the user computing device.

20. The at least one non-transitory computer-readable storage medium in accordance with claim 15 wherein the NFC channel is established with a first merchant mobile device, the first merchant mobile device in communication with the merchant computing device at the first physical location.

* * * * *